Oct. 20, 1925.

J. WHITELEY

AMUSEMENT DEVICE

Original Filed Feb. 21, 1924  5 Sheets-Sheet 1

1,558,133

INVENTOR.
JAMES WHITELEY
BY
ATTORNEY.

Oct. 20, 1925.  1,558,133
J. WHITELEY
AMUSEMENT DEVICE
Original Filed Feb. 21, 1924    5 Sheets—Sheet 2

INVENTOR.
JAMES WHITELEY
BY

ATTORNEY.

Patented Oct. 20, 1925.

1,558,133

UNITED STATES PATENT OFFICE.

JAMES WHITELEY, OF NORTH TONAWANDA, NEW YORK, ASSIGNOR TO MAYNES CORPORATION, OF DOVER, DELAWARE, A CORPORATION OF DELAWARE.

AMUSEMENT DEVICE.

Application filed February 21, 1924, Serial No. 694,369. Renewed June 10, 1925.

*To all whom it may concern:*

Be it known that I, JAMES WHITELEY, a citizen of the United States, residing at North Tonawanda, in the county of Niagara and State of New York, have invented a new and useful Amusement Device, of which the following is a specification.

This invention relates more specifically to an amusement device of that class in which those to be amused are carried in travelling cars along an enclosed passageway, designed and arranged to simulate the body of a creeping animal, such as a serpent or a mythical dragon.

The present invention broadly consists of an elongated tunnel structure substantially semi-circular in cross section, formed of canvas or other flexible material, painted and decorated on its exterior surface to represent a creeping animal, the head portion providing a means of entrance to its interior. Disposed within the tunnelled structure is a passenger conveying apparatus in the form of a car or train of cars, provision being made to operate the apparatus intermittently in order that the passengers may enter and leave the cars without injury to themselves. Mechanism is also provided to impart motion to the cars at all periods of its operation, and also to move the tunnelled structure so as to simulate the natural movement of the animal it represents.

An important object of the invention is to provide an amusement apparatus in which the passengers may be safely transported along a definite line of travel, the transporting means being operated intermittently or step-by-step and continuously rocked during its forward movement.

Another object is to provide an apparatus in which the conveying mechanism may be locked against accidental movement as each car reaches the end of the passageway, whereby to permit a safe egress of the passengers therefrom.

A further object is to provide an amusement apparatus that may be quickly erected in position, and easily dismantled and packed for transportation.

In the accompanying drawings I have illustrated a preferred embodiment of my invention, it being understood however, that no limitation is necessarily made to the precise structural details therein exhibited, but various changes, alterations, and modifications may be resorted to within the scope of my invention when desired.

In a preferred embodiment of the amusement apparatus, 10, 11, designates foundation supports transversely disposed at the entrance and discharge ends, on which are mounted longitudinally extending side frames 12, 13, preferably formed of angle iron for supporting the conveying and other mechanisms. Each frame consists of longitudinally extending angle bars 14, 15, disposed above each other, and tied together by means of a plurality of vertically extending tie bars 16 spaced an equal distance apart through the length of the frames.

Figure 13:
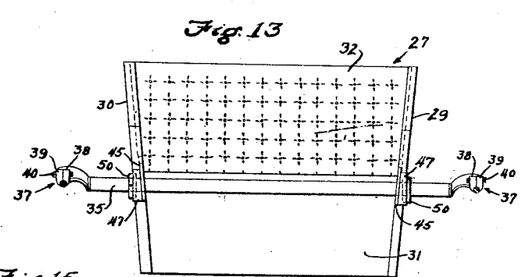
Fig. 13 is a front end elevation of one of the passenger cars.
Figure 14:
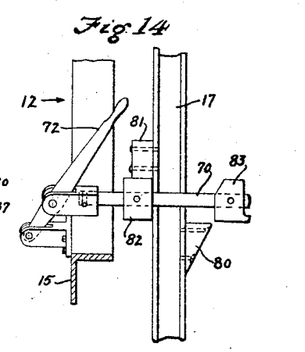
Fig. 14 is an enlarged view of the mechanism shown in Fig. 11, showing the mechanism in a disengaged position.

Referring now more particularly to Figs. 1, 2, 3, and 4, the endless passenger conveying mechanism and the operating means therefor, is mounted between and supported by the side frames, and preferably consists of a pair of main driving sheaves 17, 18, mounted on a transversely disposed shaft 19 rotating in bearings 20 secured to the upper angle bars 15 of the side frames. Mounted on a shaft 21 at the discharge end of the apparatus, is a similar pair of cable sheaves 22, 23, the sheaves at either end being connected by endless wire cables 24, 25, that pass over idler sheaves 26 located adjacent the main driving sheaves. Detachably secured to the endless cables 24, 25, and between the same are a plurality of passenger cars 27, equally spaced apart, each car preferably consisting of bottom walls 28, side walls 29, 30, and end walls 31, 32, detachably secured together so that the cars may be taken apart and conveniently packed for transportation. Cars 27 are supported on transversely extending cylindrical shafts 35, 36, disposed respectively at the front and rear ends thereof; the end of each of said shafts are socketed for the reception of cable clamping devices 37, in this instance comprising a stationary jaw 38, see Fig. 19, and a movable jaw 39, a bolt 40 holding the members securely in clamped engagement with the conveying cables when secured thereto, as the clamping members do not entirely encircle the cables when attached so that they will offer no interference when passing over the cable sheaves. To the outer faces of the side walls 29, 30, are rigidly secured longitudinally extending strap iron bars 45, the front ends of the bars terminating in hooked or recessed ends 46; the bottom of the recesses are semi-circular so as to closely engage the circular bars. Rigidly secured to the outer face of each of bars 45 are shaft engaging members 47, provided with a centrally disposed recess 48, the bottom of the recess being semi-circular and provided with a centrally disposed socket 49 which is engaged by a circular collar 50 rigidly secured to the circular bars 35 and 36. As before noted, the cars are collapsible and in order to disassemble the same the bottom and end walls are secured in grooves formed in the inner faces of the side walls as clearly shown in Figs. 13, 17, and 19 of the drawings. By means of this construction when the cars are inverted during their rotation the collar 50 will prevent the cars from becoming disengaged from the bars 35 and 36. In order to facilitate a return movement of the cars to the entrance end of the apparatus, and also prevent a sagging action on the lower runs of the cables, longitudinally extending beams 51 are provided, said beams being secured by angle clips 52 secured to a plurality of transversely disposed bars 53 that form a support for the side frames of the apparatus.

The mechanism for driving the conveying apparatus preferably consists of an engine 54 suitably disposed on the framework on the forward end of the apparatus, the engine being preferably of the internal combustion type. The drive shaft 55 of the engine is provided with a driving pulley 56 belted to a pulley 57 secured to one end of a clutch shaft 58, the other end of the clutch shaft having the male clutch member 59 that engages the other female member 60 of the clutch. Clutch member 60 is rigidly secured to the inner end of a shaft 61 that is suitably mounted in bearings mounted on a framework 62, and carries a spur gear 63 that meshes with a gear 64 secured to a shaft 65, the ends of said shaft being provided with spur pinions 66 that engage internal gear 67 secured to the inner oppositely disposed faces of the cable driving sheaves 17 and 18.

In order that each of the passenger cars may be brought to a stop when they reach the discharge end of the apparatus, it will be apparent that means must be provided for automatically disengaging the cable conveying means from the driving mechanism, and to this end I have provided a clutch disengaging mechanism comprising a reciprocating shaft 70 mounted in suitable bearings 71 secured to the frame of the machine, the outer end of the shaft being pivotally connected to an operating lever 72 mounted in a bearing on the side frame 12 of the apparatus. Pivotally secured to shaft 70 is a clutch operating rod 73, its free end being pivotally secured as at 74 to the frame 62. Rod 73 is provided intermediate its ends with a downwardly extending pin 75 that engages a grooved collar 76 secured to the male clutch member for disengaging the same from clutch member 60 on a shifting movement of the reciprocating shaft 70. The inner face of sheave 17 is provided adjacent its periphery with cam members 80 diametrically disposed, and on its outer face adjacent the cam members with lugs 81. Rigidly secured to shaft 70 on either side of sheave 17 is an abutment member 82 and a shaft shifting member 83 that is designed to be operated on one-half a rotation of the driving sheaves, the distance between the cam and abutment members on the sheaves determining the length of travel of the conveying apparatus before the same is brought to a stop.

Figure 1:
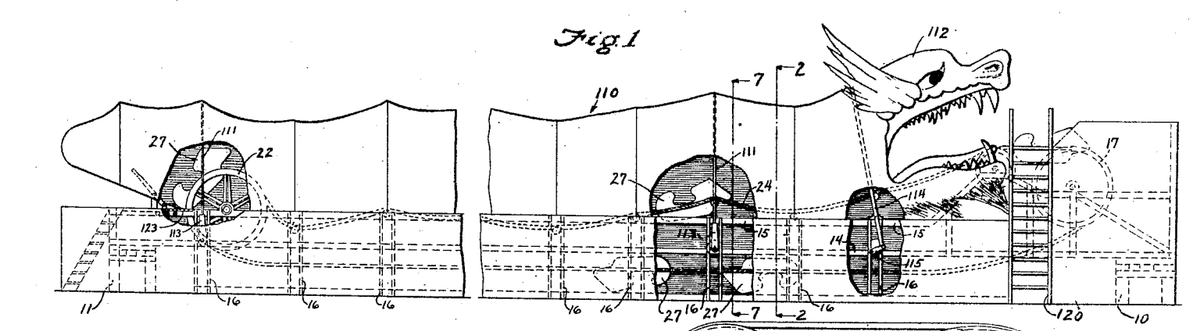
Fig. 1 is a side elevation of the amusement device, portions of the cover mechanism being broken away to disclose the conveying mechanism.
Figures 2, 17, 18, 19:
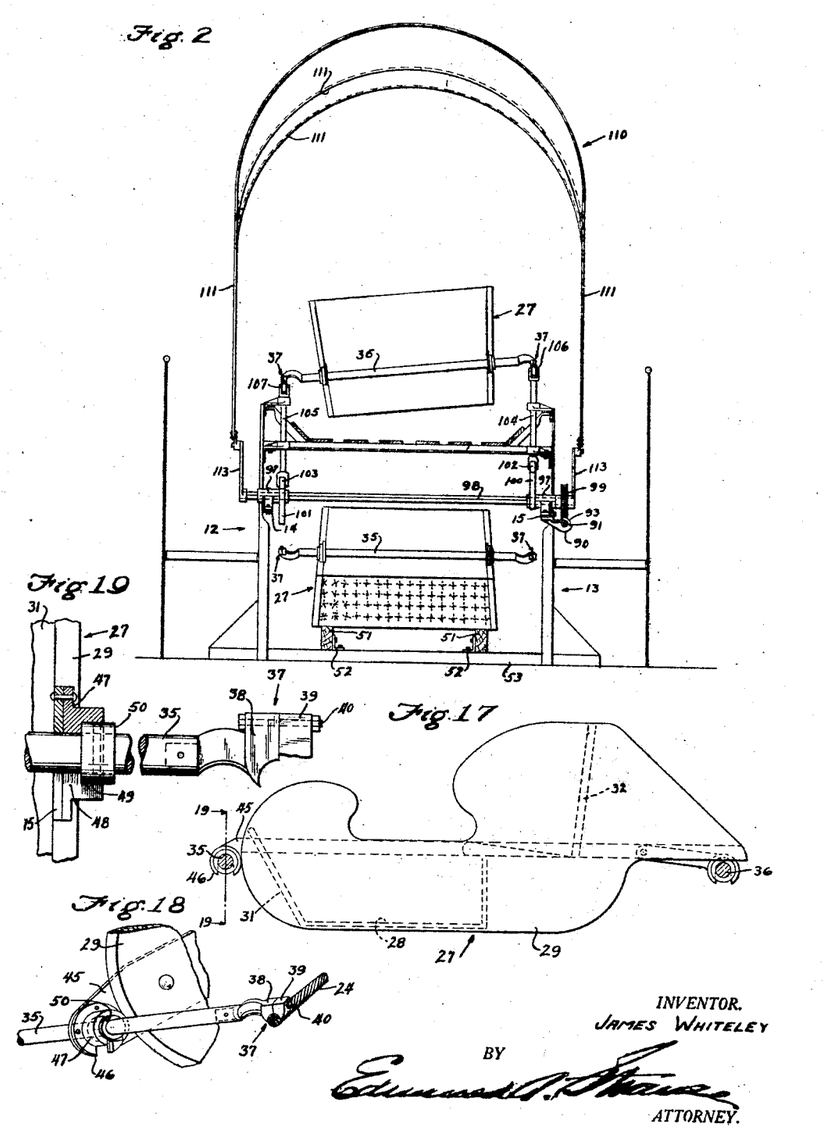
Fig. 2 is an enlarged transverse section of the amusement device taken on line 2—2 of Fig. 1.
Fig. 17 is an enlarged side elevation of one of the passenger cars.
Fig. 18 is a perspective view of the means for attaching the passenger cars to the conveying cables.
Fig. 19 is an enlarged detail section of the cable and car attaching means taken on line 19—19 of Fig. 17.
Figure 3:
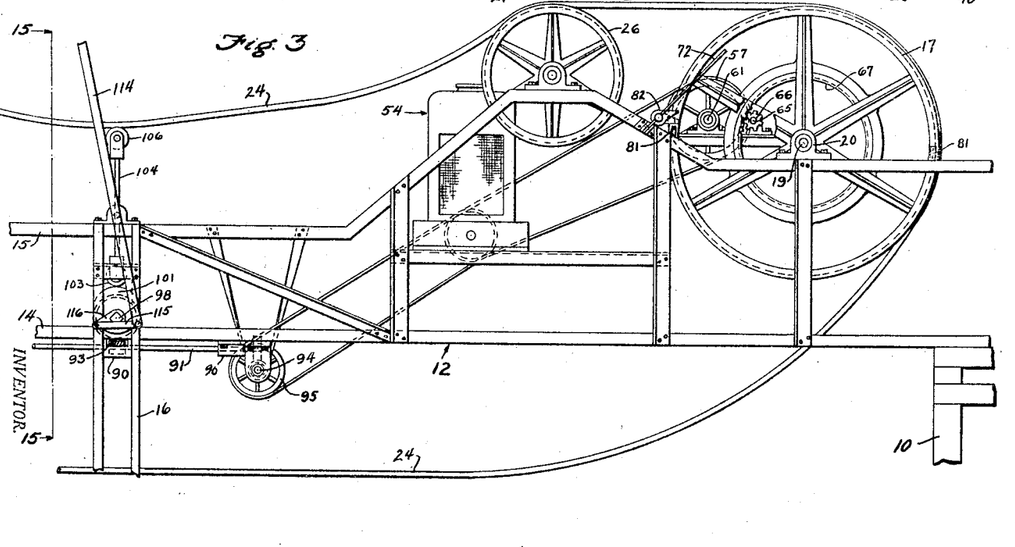
Fig. 3 is an enlarged partial side elevation of the conveyor driving mechanism.
Figure 4:
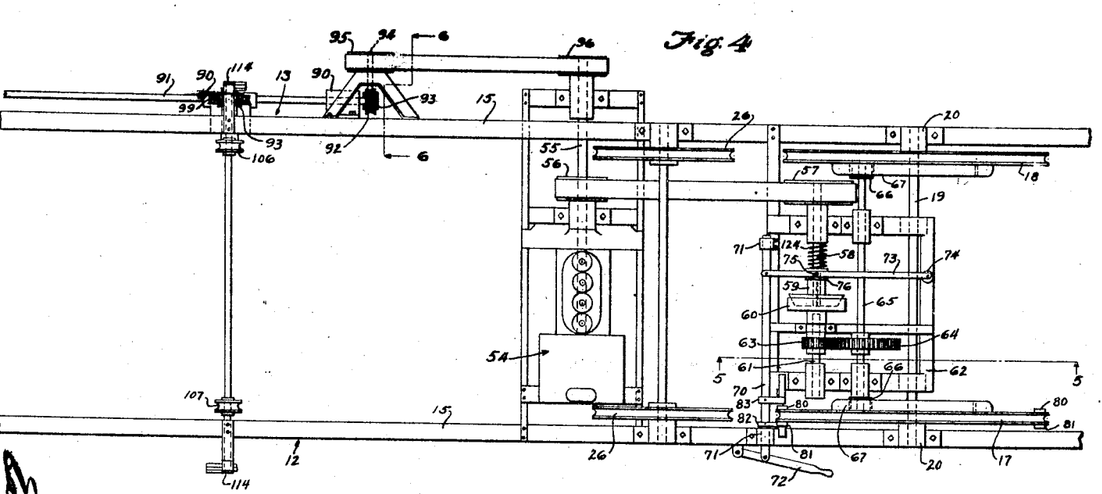
Fig. 4 is a plan view of the same.
Figure 5:
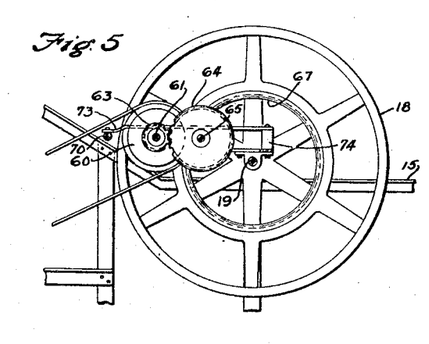
Fig. 5 is an enlarged transverse section of the conveyor driving mechanism taken on line 5—5 of Fig. 4.
Figure 6:
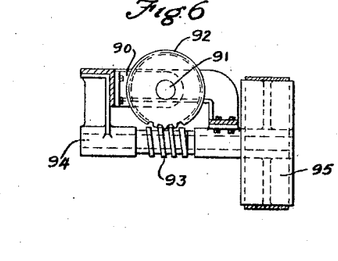
Fig. 6 is a detail cross section of one of the passenger car rocking and cover actuating means.
Figure 7:
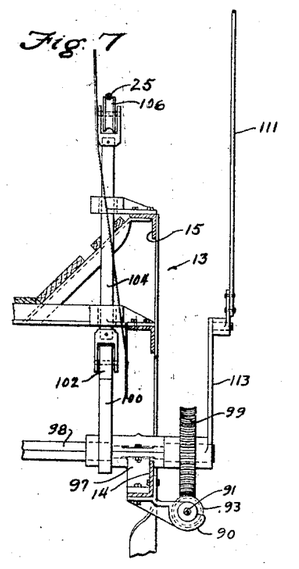
Fig. 7 is an enlarged transverse section of the passenger car rocking and cover actuating means taken on line 7—7 of Fig. 1.
Figure 8:
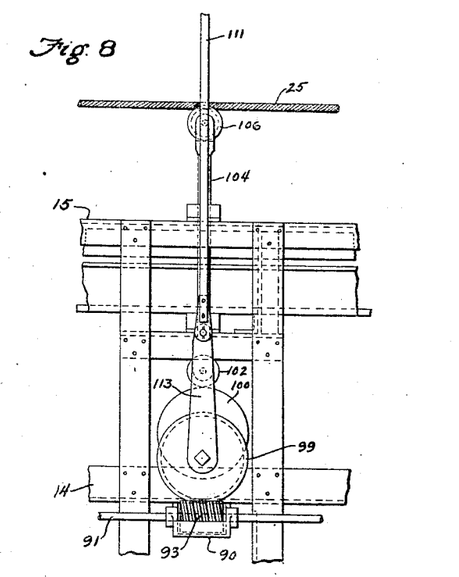
Fig. 8 is an enlarged detail side elevation of the same.

In order to impart a rocking or transverse motion to the passenger cars 27 at all times during the operation of the apparatus, I have provided a plurality of car rocking mechanisms secured to the side frames 12 and 13, equally spaced apart, as clearly shown in Fig. 1 of the drawings. As all of these mechanisms are exactly similar I will describe only a single set. Secured directly below angle bar 14 of the side frame 13 and mounted in bearings 90 secured to said angle bar, is a longitudinally disposed shaft 91 which extends from the last rocking mechanism at the discharge end of the apparatus forwardly and terminating adjacent the front of the apparatus, the end of the shaft being provided with a worm wheel 92 that meshes with a worm 93 attached to a transversely disposed shaft 94, which carries on its outer end a pulley 95 that is belted to a pulley 96 secured to the outer end of the engine drive shaft 55, the shaft 91 being continuously rotated during the operation of the apparatus. Disposed between side frames 12 and 13 and rotatively mounted in bearings 97 secured to angle bars 14, is a shaft 98 which carries on one of its outer ends adjacent frame 13, a worm wheel 99 that meshes with the worm 93 to transmit power to the shaft 98. Rigidly secured to shaft 98 adjacent frames 12 and 13 are cam members 100, 101, whose peripheral edges engage rollers 102, 103, secured on the lower ends of vertically disposed shafts 104, 105, that are secured in bearings attached to the inner faces of the side frames, the upper ends of shafts 104, 105, each carrying grooved wheels 106, 107, in the grooves of which the conveyor cables are carried during the operation. By referring to Fig. 2 it will be observed that the high points of the cams 100, 101, are oppositely disposed and as a consequence on a rotation of shaft 98, the vertically disposed shafts 104, 105, will be alternately reciprocated upwardly to continuously rock the passenger cars 27, from side to side during the operation of the apparatus, and also impart an undulating motion thereto.

A collapsible tunnel 110 is mounted to completely cover the conveying mechanism and passenger cars attached thereto. This tunnel is made up of a plurality of inverted U-shaped frames 111 of varying heights for supporting the wall of the tunnel which is preferably formed of a heavy fabric, such as canvas designed to be moved in a sinuous manner to simulate the movement of a creeping animal, the forward end of the tunnel being formed to represent an animal head 112 with its mouth or jaws normally open.

Figure 15:
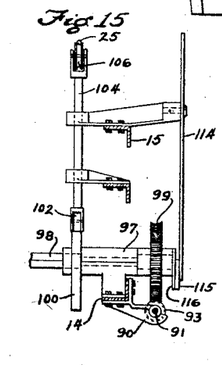
Fig. 15 is an enlarged cross section of the mechanism for operating the head of the device, taken on line 15—15 of Fig. 3.
Figure 16:
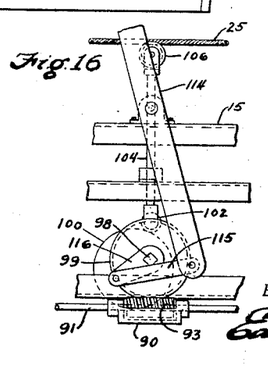
Fig. 16 is a side elevation of the same.

This tunnel is supported, and moved in the following manner. The shafts 98 have secured to their extreme outer ends, cranks 113, to the free ends of which are secured the lower ends of the supporting frames 111, the cranks are secured to the shafts 98 in such a manner as to impart an undulating movement to the fabric tunnel while the mechanism is in operation. The upper jaw of the head 112 is designed to open and close at intervals during the operation of the apparatus, and provides for the entrance of passengers to the conveying mechanism located within the tunnel. To accomplish the movement of the animal's jaw, I have provided a mechanism, which preferably consists of an inverted U-shaped frame 114, the upper semi-circular portion engaging the upper jaw of the animal head, the free ends being pivotally secured to links 115, and their free end in turn being pivoted to crank arms 116, secured to the outer ends of the transversely mounted cam operating shaft of the forward car rocking mechanism that is disposed adjacent the front end of the apparatus, this mechanism being clearly illustrated in Figs. 3, 15 and 16 of the drawings.

Figures 9, 10:
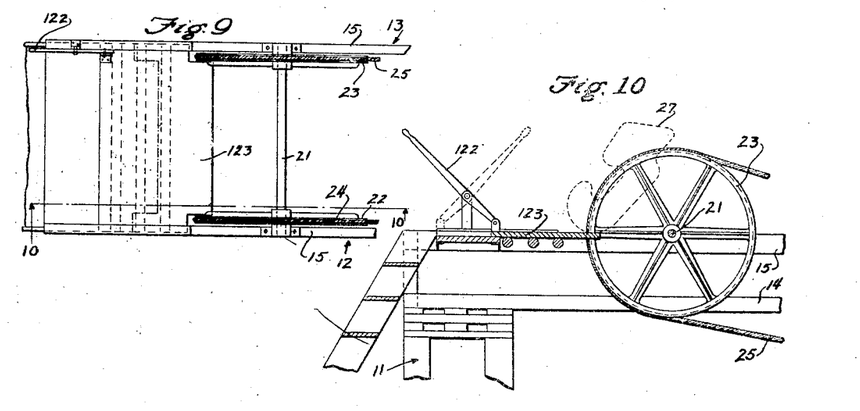
Fig. 9 is an enlarged partial plan view of the discharge end of the conveying mechanism, illustrating the safety device.
Fig. 10 is a longitudinal section of the discharge end of the conveying mechanism taken on line 10—10 of Fig. 9.
Figure 11:
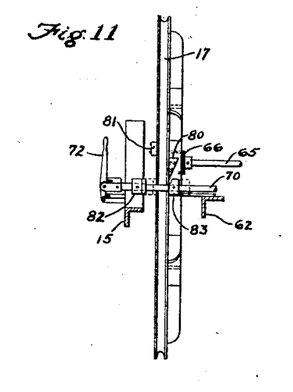
Fig. 11 is an enlarged cross section of the clutch actuating mechanism for automatically disengaging the clutch of the conveyor driving mechanism, and the mechanism connected thereto for locking the cable directing sheaves against movement.
Figure 12:
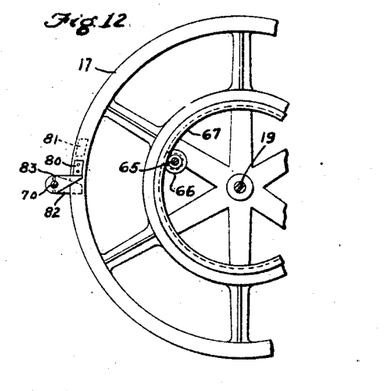
Fig. 12 is a side elevation of the same.

The operation of the form of apparatus above described is as follows: When the amusement apparatus is operating the passengers ascend the ladder 120 to a platform disposed directly in front of the entrance to the tunnel. When the passengers are seated in a car disposed alongside the platform the attendant shifts lever 72 outwardly to force the clutch into engagement, power being transmitted from the engine 54 through the medium of driving mechanism heretofore described. As sheave 17 makes one-half of a revolution the cam 80 on its inside face will contact with member 83 on the shaft 70 to shift the same inwardly to throw the clutch out of engagement, at the same time the lug 81 on the outer face of the sheave 17 contacts with abutment member 82 to prevent the further rotation of the driving sheaves, thus preventing an accidental movement of the conveying mechanism. As soon as the conveying mechanism has ceased its motion, an attendant at the discharge end of the apparatus shifts a lever 122 pivotally connected to a safety platform 123 from its position shown in dotted lines, (see Figs. 9 and 10) directly into the path of the passenger car that has reached the discharge end of the apparatus, the platform constituting an additional safety device, it being understood that the process of loading and discharging passengers from the cars takes place simultaneously. When the cars have been loaded and discharged, as above described, the attendant at the forward end of the apparatus releases the lever 72, a coil spring 124 forcing the clutch member through the medium of pin 75 and grooved collar 76 into engagement, at the same time forcing the abutment member out of the path of the lugs 81 secured to the side faces of the sheave, the attendant at the discharge end shifting the platform 123 out of the path of the cars. From this it will be noted that the passenger cars travel intermittently from one end to the other of the apparatus, and as the attendant positively controls the movement of the apparatus, no injury is likely to occur to the passengers being transported.

As the mechanisms for continuously rocking the passenger cars, moving the tunnelled structure and operating the jaw of the simulated animal, are directly connected to the power transmission of the apparatus, it will be apparent that the movements of the mechanisms will be continuous.

From the above description it will be apparent that I have provided an apparatus that will furnish amusement to a number of persons, and although the conveying mechanism is operated intermittently to take on and discharge passengers from the cars, a continuous movement will be imparted to the various passenger cars to furnish additional amusement during the stoppage of the conveyor mechanism. Further, as safety appliances are provided at the front and rear of the apparatus, no serious or untoward accidents could possibly occur to the passengers being transported through the device.

By painting the exterior of the tunnel structure to represent the body of a creeping animal, such as a dragon or serpent provided with a moving head, and arranging suitable ornamental screens at the base thereof, a realistic exterior appearance is attained, at the same time affording considerable amusement to spectators and exciting their curiosity in the apparatus enclosed therein.

What I claim is:

1. An amusement apparatus comprising an endless passenger conveying mechanism designed to traverse a substantially straight path, a tunnel structure mounted over said mechanism and connected thereto for movement, and means to operate said conveying mechanism.

2. An amusement apparatus comprising and endless passenger conveying mechanism arranged to operate in a substantially straight direction, a tunnelled structure formed to simulate a creeping animal, and means to operate said conveying mechanism and tunneled structure.

3. An amusement apparatus comprising an endless conveying mechanism having passenger cars attached thereto arranged to traverse a substantially straight path, a movable tunnel structure covering said mechanism, and means to operate said conveyor and tunneled structure.

4. An amusement apparatus comprising an endless passenger conveying mechanism arranged to traverse a substantially straight path, a movable tunnel structure mounted over said mechanism and connected thereto, means to automatically and intermittently operate said conveying mechanism, and means to continuously operate said tunnel structure.

5. An amusement apparatus comprising an endless passenger conveying mechanism having passenger cars attached thereto, a collapsible tunnel structure covering said mechanism and connected thereto for movement, means to automatically and intermittently operate said conveying mechanism, whereby passengers may enter and leave the cars during the stoppage of the conveyor, and means to operate said tunnel structure.

6. An amusement apparatus comprising two pairs of grooved sheaves, each pair being spaced apart, endless conveyor cables connecting said pairs of sheaves, passenger cars mounted between said cables and attached thereto to move therewith, a collapsible tunnel structure covering said cable conveyor and attached thereto for undulating movement, motive means to operate a pair of said cable sheaves, and means to operate said tunnel.

7. An amusement apparatus comprising an endless passenger conveying mechanism having passenger cars attached thereto arranged to traverse a substantially straight path, a movable tunnel structure secured to and covering said mechanism, means to operate said conveyor intermittently, and means to move said tunnel structure.

8. An amusement apparatus comprising an endless passenger conveying mechanism provided with a plurality of passenger cars, a movable tunnel structure secured to and covering said mechanism, means to impart movement to said tunnel on an operation of the conveying mechanism, means to operate said conveying mechanism intermittently, and means to continuously impart motion to said passenger cars during the operation of the apparatus.

9. An amusement apparatus comprising an endless passenger conveying mechanism having passenger cars attached thereto, a collapsible tunnel structure secured to and covering said mechanism, means to impart movement to said tunnel during the operation of the conveying mechanism, means to operate said conveyor, and means to impart movement to the cars independently of the conveying mechanism.

10. An amusement apparatus comprising an endless passenger conveying mechanism having a plurality of passenger cars attached thereto designed to traverse a substantially straight path, a movable tunnel adapted to enclose the conveying mechanism and cars attached thereto, means to move the cars independently of the conveying mechanism movement, means to impart an undulating movement to the tunnel structure, and means to automatically and intermittently operate said conveyor mechanism.

11. An amusement apparatus comprising a pair of elongated side frames spaced apart, a pair of cable sheaves mounted at one end of said frame, a pair of cable sheaves mounted at the opposite end, a pair of endless cables connecting said sheaves, a plurality of passenger conveying cars attached to said cables, motive means for driving said first mentioned pair of cable sheaves, means to automatically disconnect the motive means from said first mentioned sheaves at predetermined intervals, cam means for imparting continuous motion to the passenger cars during an operation of the apparatus, a collapsible tunnel structure covering said apparatus, and means to move said tunnel structure continuously during the operation of the apparatus.

12. An amusement apparatus comprising an endless cable conveying mechanism having a plurality of passenger cars attached to said apparatus, a collapsible tunnel structure mounted above and enclosing said conveying mechanism, said structure arranged to simulate a creeping animal provided with a head having an opened mouth, means to operate said conveying mechanism intermittently, means to move the head and upper jaw of said tunnel structure during the operation of said conveying mechanism, means to operate the tunnel structure to simulate the movement of a creeping animal, and means to lock the conveying mechanism against movement during its period of rest.

13. An amusement apparatus comprising an endless passenger conveying mechanism provided with a plurality of cars equally spaced apart, a movable tunnel structure covering said mechanism and operatively connected thereto for movement therewith, motive means to drive said conveying mechanism intermittently and to continuously operate said tunnel structure, a clutch mechanism interposed in said driving mechanism, and means to automatically actuate said clutch to disconnect the conveyor driving means from the conveying apparatus.

14. An amusement apparatus comprising an endless conveying mechanism provided with a plurality of passenger transportation cars, said mechanism arranged to operate in a substantially straight path, a fabric tunnel structure connected to the frame of said conveying mechanism, a conveyor driving means connected to said conveying mechanism, a disconnecting means interposed in said conveyor driving means for intermittently interrupting its movement, and means for automatically operating said disconnecting means.

15. An amusement device comprising a pair of endless cables spaced apart and rotating means therefor, a plurality of passenger cars detachably secured between and to said cables, means to automatically disconnect said cables from their driving means at predetermined periods of their rotation, a fabric tunnel mounted above the cables and means to cause an undulating movement thereto during the operation of the endless cables, a plurality of shafts transversely disposed between said cables, each shaft carrying a pair of cams, a plurality of pairs of lifting rods, the lower ends of said rods contacting with the edges of said cams, a pair for each cam carrying shaft, the upper ends of said rods engaging said pair of endless cables, whereby on a rotation of said cams the rods will be reciprocated to impart a rocking motion to the passenger cars attached to the cables, and means to rotate said shafts on an operation of the apparatus.

16. An amusement apparatus comprising the combination of a passenger-carrying car or train, a support therefor, a tunnel structure thereover formed to simulate a creeping animal and means for imparting an undulating movement to the support and tunnel.

17. An amusement apparatus comprising the combination of a passenger-carrying car or train a support therefor, a tunnel structure thereover formed to simulate a creeping animal, and rotatable means for imparting an undulating movement to the support and tunnel.

18. An amusement apparatus comprising the combination of a passenger-carrying car or train, a tunnel structure formed to simulate a creeping animal, means for moving the car or train through the tunnel and means for imparting a rocking movement to the car or train and an undulating movement to the tunnel structure.

19. An amusement apparatus comprising the combination of a passenger-carrying car or train, a support therefor, a tunnel structure thereover formed to simulate a creeping animal, means for imparting an undulating movement to the support and means for moving the car or train through the tunnel with a step-by-step movement.

20. An amusement apparatus comprising the combination of a passenger-carrying car or train, a tunnel structure formed to simulate a creeping animal, means for moving the car or train through the tunnel with a step-by-step movement and means for continuously rocking the car or train.

21. An amusement apparatus comprising the combination of a passenger-carrying car or train, a tunnel structure formed to simulate a creeping animal provided with a head having an opened mouth, means for moving the car or train through the tunnel and means for moving a jaw of the mouth and undulating the body of the tunnel to simulate the movement of the creeping animal.

22. An amusement apparatus comprising the combination of a passenger-carrying car or train, a support therefor, a tunnel structure thereover and means for imparting an undulating movement to the support and tunnel.

23. An amusement apparatus comprising the combination of a passenger-carrying car or train, a tunnel structure thereover, means for moving the car or train through the tunnel with a step-by-step movement and means for continuously rocking the car or train.

24. An amusement apparatus comprising the combination of a passenger-carrying car or train, a pair of supporting cables extending longitudinally thereof on either side, means for moving the cables to advance the car or train, and means for undulating the cables independently of each other whereby a rocking and undulating movement is imparted to the car or train.

25. An amusement apparatus comprising the combination of a passenger-carrying car or train, a pair of cables extending longitudinally thereof one on either side, a plurality of supports for the upper runs of each cable, means for moving the cables over the supports to advance the car or train and means for reciprocating the supports independently of each other whereby a rocking and undulating motion is imparted to the car or train.

26. An amusement apparatus comprising the combination of a passenger-carrying car or train, a pair of cables extending longitudinally of the car or train one on either side, a plurality of supports for the upper runs of each cable, means for moving the cables step-by-step to advance the car or train, and means for continuously undulating the cables independently of each other whereby a rocking and undulating motion is imparted to the car or train during the forward movement and a rocking movement when the car or train is not advancing.

27. An amusement apparatus comprising the combination of an endless passenger-carrying conveyor, means for moving the conveyor, and means for undulating the sides of the conveyor independently of each other to impart an undulating and rocking motion thereto.

In witness that I claim the foregoing I have hereunto subscribed my name this 11th day of February, 1924.

JAMES WHITELEY.